Figure 5:
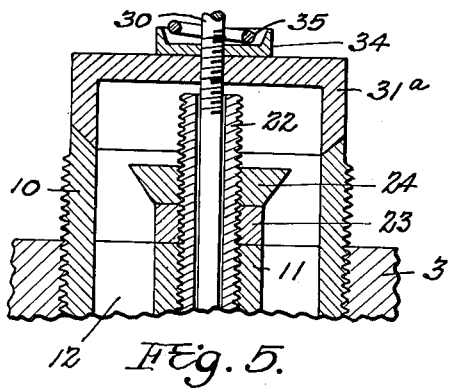

Feb. 2, 1937. A. F. FLOURNOY 2,069,522
RELIEF VALVE
Filed Dec. 22, 1932 2 Sheets-Sheet 1
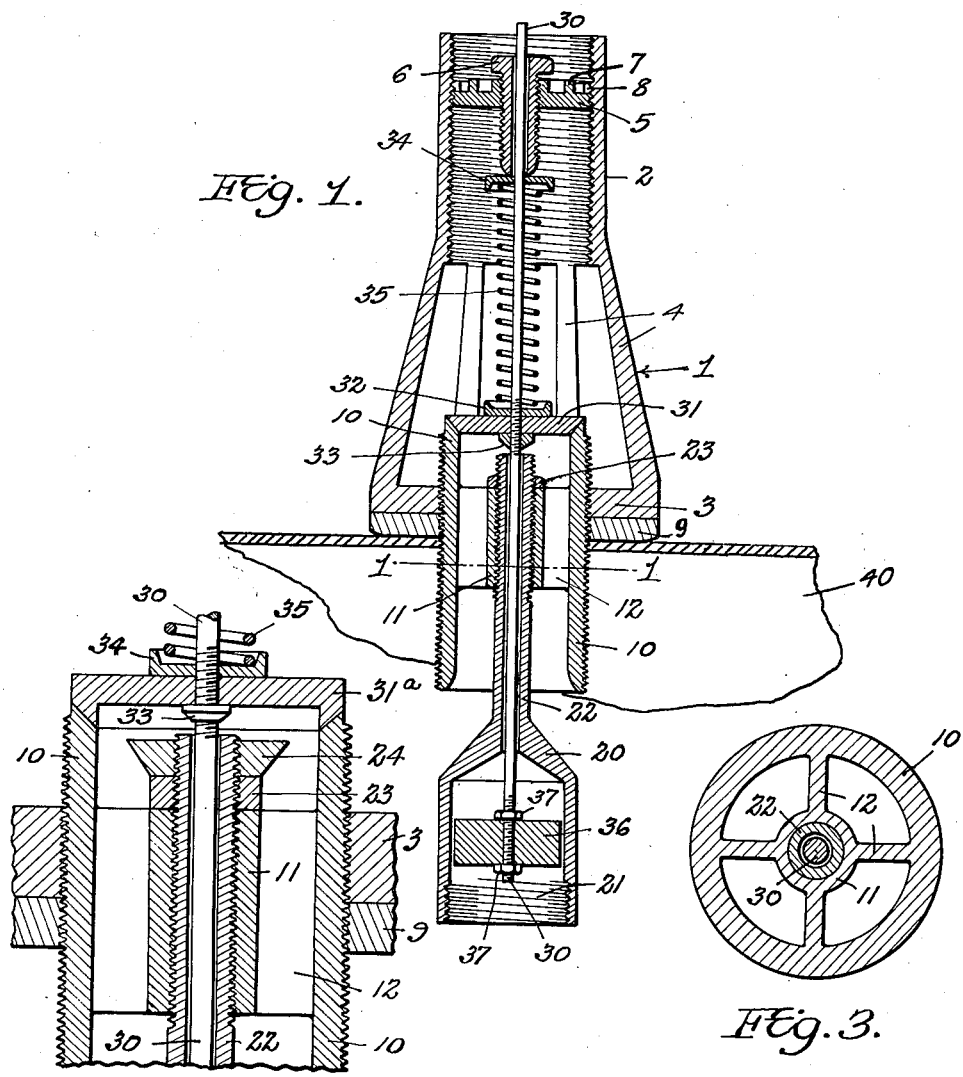

Feb. 2, 1937.  A. F. FLOURNOY  2,069,522
RELIEF VALVE
Filed Dec. 22, 1932   2 Sheets-Sheet 2

Inventor
Algernon F. Flournoy

Patented Feb. 2, 1937

2,069,522

UNITED STATES PATENT OFFICE 2,069,522

RELIEF VALVE

Algernon F. Flournoy, Monroe, La.

Application December 22, 1932, Serial No. 648,478

6 Claims. (Cl. 137—53)

My invention relates to relief valves, and the like.

Before describing my improvement in this art, I shall set up as a background, some of the fundamental principles of operation of relief valves and difficulties encountered in connection with the operation of relief valves.

The purpose of a relief valve or safety valve, is to let out steam, or other gases, sufficiently fast to prevent the pressure in a boiler, or like device, from reaching a dangerous point. If the boiler is to be safe, the valve after its plate has lifted must allow steam to exhaust faster than the steam is being generated. The valve should also stay open long enough to exhaust enough steam so that when its seats the boiler pressure will be about three to five percent lower than the pressure which caused the valve to lift. This is known in the trade as percentage of blow down.

The principle of operation of safety valves in general is as follows:

When the force acting on the pressure face of the valve plate becomes greater than the opposing force, the valve lifts. This steam pressure force before the lift is equal to the pure pressure force on the lower side of the valve plate, but when the valve lifts the pressure force is the combined force due to both pressure and the reaction of escaping steam impinging upon the valve plate. The opposing force necessary to keep the valve normally closed in safety valve constructions has been supplied by means of a weight acting directly on the valve plate, a weight acting through the mechanical advantage of a fulcrum and lever, and a third and the most popular method of a compression spring.

The principal limitation of safety valves of the type heretofore invented and the safety valves on the market, is that they do not lift sufficiently high to allow for the maximum discharge of steam. This comes about by the fact that the steam force, during the lift of the valve, rises slightly and then diminishes very rapidly thereafter, while the opposing force, during the rise of the valve plate, stays constant in the case of weighted valves and increases in the case of the compression spring valves. The net effect is that present day safety valves do not lift but about one-eighth of an inch, irrespective of the diameter of the valve plate. Theoretically, the correct lift to give maximum discharge is one fourth of the diameter of the orifice closed by the valve plate. This is readily appreciated from the simple calculation as follows:

The area of the cross section of the orifice closed by the valve plate is $$\pi \times \frac{(\text{diameter})^2}{4}$$

which is equal to the circumference ($\pi$ diameter) times a lift of $\dfrac{\text{the diameter}}{4}$ The object of my invention is to provide means to increase the lift of safety valves by increasing the steam force on the valve plate.

Figure 2:
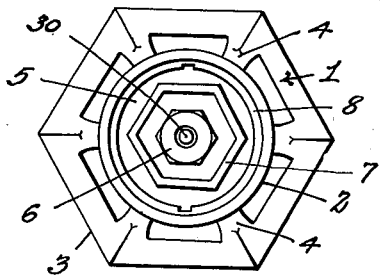
Figure 6:
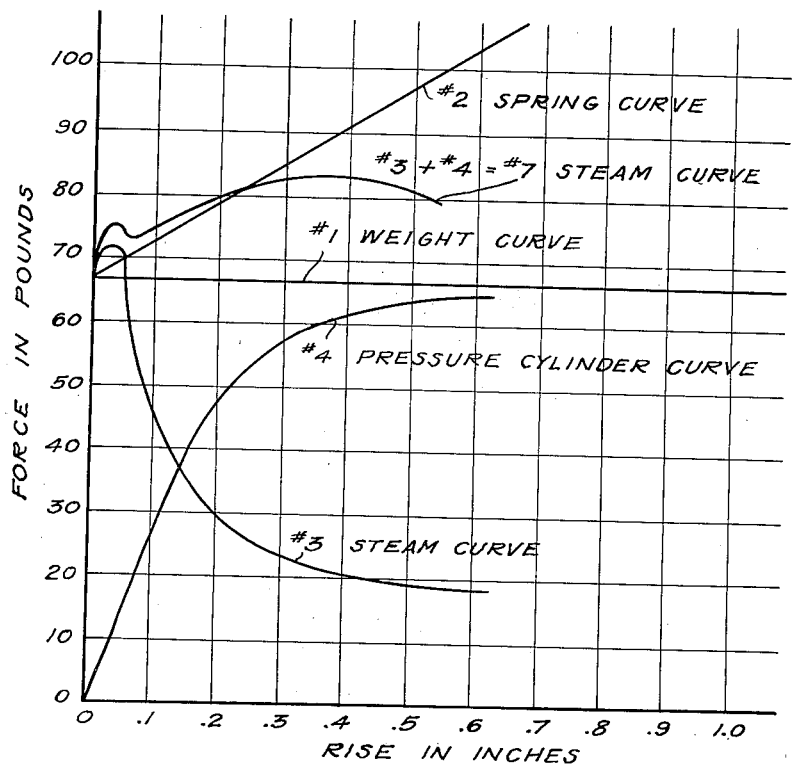

Other objects of my invention will appear from the description, and drawings, of this invention, of which, Figure 1 is a vertical cross sectional view, Figure 2 is a plan view of the top of the valve, Figure 3 is a cross-sectional view at 1—1 of the valve, Figure 4 is a modification of the valve, Figure 5 is a diagrammatical view of the valve showing a particular adjustment of the valve, and, Figure 6 is a plot of pressure forces during the rise of the valve.

In the drawings, wherein for the purposes of illustration is shown a preferred embodiment of my invention, the numeral 1 designates the frame portion of my valve, comprising a cylinder 2, internally threaded, a hexagonal base portion 3, with a threaded hole through its center portion and spaced apart upright members (six) 4 connecting the upper cylinder 2 and the base portion 3.

The device shown threaded into the upper end of the upper cylinder 2, designated by numerals 5 to 8, is an adjusting device for adjusting the spring pressure on the valve plate. The plate 5 provides a means of giving coarse adjustment. This plate is adapted to be lowered or raised by means of a socket wrench. The upstanding hexagonal wall 7, is made the size of a standard socket wrench opening. The element designated by 6 is a unitary hollow shank terminating at its upper end in a hexagonal nut. This element is threaded through the plate 5 with fine threads to permit of fine adjustment of the valve spring. 8 is a locking ring which serves to secure the plate 5 in any adjusted position, and 9 is a lock nut which serves as a means of securing the bases at any adjusted position on the cylinder 10. Obviously, the frame 1 and cylinder 10, could be made in a single casting, if such a practice proved economical and expedient in the manufacture of this valve.

Numeral 10 is a cylinder externally threaded to fit and be secured in the base portion 3 of the frame 1 and in the pressure shell 40. In the center of the cylinder 10, there is a smaller cylindrical portion 11, secured within the same by means of vertical vanes 12. This inner cylindrical portion 11 is threaded internally to receive another member.

Numeral 20 represents a pressure cylinder. This pressure cylinder has a slender hollow neck portion 22, externally threaded. By means of this external threading, the pressure cylinder is secured in the inner cylinder portion 11 of the cylinder 10. This pressure cylinder 20 is designed to depend from below the cylinder 10 a sufficient distance so as not to materially interfere with the flow of steam through the cylinder 10. The lower portion of the pressure cylinder 20 is internally threaded at 21, to allow for an extension of the same, if desired. The external diameter of the pressure cylinder 20 is preferably made less than the diameter of the threaded cylinder 10, so that it may easily be passed through the pressure shell opening intended to receive the threaded cylinder 10. The lock nut 23 serves as a means to secure the pressure cylinder 20 in whatever position it is adjusted to. The threading on the hollow neck portion 22 extends from a medial point on the stem to the upper end of the same. By virtue of the threaded tip portion of the neck portion 22, a special deflecting tip 24 may be used, if desired, (see Figure 4).

Coming now to the moving elements of the valve, 30 represents a stem on which is fastened the valve head 31. This valve plate 31 is threaded on the valve stem 30 and locked in place by means of a spring cap 32, threaded on the stem above the valve plate 31, and a tapered nut 33 below the valve plate. The upper spring cap 34 loosely fits the valve stem. Confined between the valve caps there is a compression spring 35, which surrounds the valve stem 30. The valve stem 30 fits loosely in the hollow adjusting shank 6. The valve stem 30 extends through and fits loosely in the hollow neck portion 22 of the pressure cylinder 20. At the lower end of the valve stem 30 there is threadedly secured thereto a piston 36, and locked in place by means of clamping nuts 37. The piston 36 fits loosely within the cylinder to prevent any possibility of its sticking, but close enough to prevent any large volume of steam from passing by it.

If, in practice, it ever appears that there is any tendency for the piston to stick, it might be advisable, from a standpoint of safety, to mount the piston on a separate shaft from the shaft that the valve plate is mounted on. In this way, no sticking of the piston could interfere with the action of steam otherwise on the valve plate 31. In this case, a set screw should be screwed through the wall of the cylinder, below the piston, so as to prevent the piston from dropping down into the boiler. With the shaft 30 divided at the lower surface of the valve plate 31, a nut as 33 threaded on the upper end of the piston stem portion would also serve to prevent the piston from dropping down into the boiler.

The tip 24 in the modification of the valve illustrated, in Figure 4, serves to deflect steam outwardly during the discharge of steam after the valve has opened. The valve plate with the dependent flange 31a is a modification of the flat valve plate 31. The inverted cup shape of this style of valve allows for a greater reaction of the discharging steam, and a resulting increase in the upward force, while the deflecting tip 24 acts to direct steam away from the center portion of the valve plate for the purpose of lessening the back pressure of steam. Each device serves a valuable function at particular stages of the lift of the valve. During the initial lift of the valve, the deflecting tip has little or no effect, while the cupped valve face has a large effect at this stage.

In the adjustment illustrated in Figure 5, the conical nut 33 is removed to allow the hollow neck portion 22 to extend up into the upper portion of the valve 31a. Obviously, the nut 33 could be left in place, if desired, and the valve 31a could be made with a deeper side wall, if desired.

The valve set forth in this specification may be made of any suitable metal, but should be made preferably of brass, or other non-corroding material to prevent the possibility of parts sticking.

The operation of the valve is as follows:

When the valve is seated, the upward pressure exerted on the valve is equal to the boiler pressure over the net area of the valve plate exposed to this boiler pressure. Under this condition, boiler pressure, which reaches the upper surface of the piston through neck portion 22 of the pressure cylinder 20, and around the piston 30, is acting on each face of the piston 36, so that there is practically no net upward force due to the piston means, at this stage. As soon as the valve lifts the situation changes. The upward force on the valve plate after the valve has lifted is made up of the partial pressure of steam on the valve plate, the reaction of the rushing steam on the valve plate and an upward force equal to the difference in pressure of steam on the upper and lower faces of the piston. The higher the valve lifts the greater this last mentioned source of force becomes, because the pressure on the top side of the piston is lowering as the valve plate rises. This effect is heightened by the deflecting tip 24, which directs steam away from the center of the valve plate. This condition holds true when either the flat valve plate 31 or the cupped shape valve plate 31a is used. The conical nut 33 also helps to deflect steam away from the center portion of the valve plate, and helps to lessen the steam pressure at the center of the valve and the consequent pressure on the upper face of the piston 36.

This added piston force compensates for the loss in force due to steam escaping without reacting on the valve plate. The piston and cylinder may be made proportionately larger if necessary in which case the net lifting force will be much greater after an appreciable lift of say one-eighth of an inch than before the lift because of the extra large piston area. Reference to the charts illustrated in Figure 6 will make this discussion clearer.

Number 1 is the plot of the downward force in the case of a directly weighted valve. The force here remains constant through the rise of the valve plate. No. 2 is a plot of a typical spring force in a safety valve of the type of valve illustrated in the instant specification. This force is shown to increase as the valve rises.

Number 3 is a plot of the steam force on a plain flat valve plate, without my pressure cylinder attachment. Number 4 is the plot of the added force due entirely to the pressure cylinder and piston attachment. Curve member 7 which is the plot of combined curves 3 and 4 shows the total upward force acting to lift the valve. The point of intersection of the spring curve and the steam curve is the point at which the valve plate ceases rising for the definite pressure indicated on the chart, and marks the distance the valve rises. Should the pressure increase, the intersection will creep up the spring curve to mark an increase in lift. Under normal conditions, the pressure falls off, due to the exhaustion of steam. Under this normal condition of action, the intersection creeps down the spring curve marking the lowering of the valve plate. After the intersection passes the hump in the steam curve in the closing operation, the valve snaps suddenly to a closed position. The spring force during this period of the closing operation is considerably greater than its opposing steam force. The sudden increase in the steam force shown by the hump, in the steam force curve, is a very beneficial feature, since it brings about the quick closing action of the valve and the blow down feature, both desirable features in safety valve operation.

The deflecting tip 24, the conical nut 33, and the cupped shape valve plate 31ª are all useful in obviating the difficulties at some boiler pressures of the sudden rise and fall in the characteristic steam force on a valve plate during its initial period of rise, as shown by the hump in the steam force curve. It is to be understood that the form of my invention, herewith shown and described, is to be taken as the preferred example of the same, but that various changes in the shape, size and arrangement of parts may be resorted to without departing from the spirit of my invention, or the scope of the subjoined claims.

Having thus described my invention, what I claim is:

1. A pressure responsive relief valve comprising, a main body member adapted to be mounted on a pressure shell, a throat portion providing a valve seat opening at one end, a valve adapted to close said valve seat opening, means for urging said valve to closed position, an auxiliary lifting means including a tubular housing designed to go into a pressure shell and communicate with boiler pressure and being provided with a reduced neck portion extending into the said throat and terminating at a point immediately adjacent the pressure face of the said valve, a rod mounted in the said reduced portion of the housing and a piston mounted on the rod within the housing below the said reduced portion.

2. The device as claimed in claim 1 including a steam deflector mounted on the reduced neck portion of the tubular housing.

3. The device as claimed in claim 1 including a steam deflector mounted at the center of the pressure face of the valve.

4. The device as claimed in claim 1 including a steam deflector mounted on the reduced neck portion of the tubular housing and a conical steam deflector mounted at the center of the pressure face of the said valve.

5. The device as claimed in claim 1 including a valve provided with a dependent flange.

6. The device as claimed in claim 1 wherein means for raising or lowering the said tubular housing with respect to the main body portion is provided.

ALGERNON F. FLOURNOY.